United States Patent
Tomomatsu et al.

(10) Patent No.: US 6,867,252 B1
(45) Date of Patent: Mar. 15, 2005

(54) PROPYLENE RESIN COMPOSITION AND INTERIOR AUTOMOTIVE MEMBER COMPRISING THE SAME

(75) Inventors: Ryuzo Tomomatsu, Chiba-ken (JP); Youichi Matsuo, Chiba-ken (JP); Naoki Narukawa, Chiba-ken (JP); Tetsushi Yamada, Saitama-ken (JP); Tetsuya Oda, Saitama-ken (JP)

(73) Assignees: Idemitsu Petrochemical Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/674,498

(22) PCT Filed: Mar. 8, 2000

(86) PCT No.: PCT/JP00/01386

§ 371 (c)(1),
(2), (4) Date: Nov. 13, 2000

(87) PCT Pub. No.: WO00/53673

PCT Pub. Date: Sep. 14, 2000

(30) Foreign Application Priority Data

Mar. 10, 1999 (JP) ............................................ 11/063398

(51) Int. Cl.$^7$ ................................................. C08L 3/34
(52) U.S. Cl. ........................ 524/451; 524/584; 525/240
(58) Field of Search .............................. 524/451, 584; 525/240, 191

(56) References Cited

U.S. PATENT DOCUMENTS

| | | | | |
|---|---|---|---|---|
| 4,439,573 A | * | 3/1984 | Fukui et al. .................. | 524/451 |
| 4,504,617 A | * | 3/1985 | Yui et al. ..................... | 524/426 |
| 4,694,031 A | * | 9/1987 | Morita et al. ................. | 523/203 |
| 4,769,284 A | * | 9/1988 | Kakugo et al. ............... | 428/349 |
| 4,948,841 A | * | 8/1990 | Kasahara et al. ............ | 525/240 |
| 5,086,109 A | * | 2/1992 | Ueno et al. ................... | 524/496 |
| 5,283,267 A | * | 2/1994 | Nishio et al. ................. | 523/216 |
| 5,308,908 A | * | 5/1994 | Fukui et al. .................. | 524/451 |
| 5,563,194 A | * | 10/1996 | Watanabe et al. ............ | 524/117 |
| 5,574,087 A | | 11/1996 | Kobayashi et al. .......... | 524/451 |
| 5,723,527 A | * | 3/1998 | Sadatoshi et al. ............ | 524/451 |
| 5,744,535 A | * | 4/1998 | Akagawa et al. ............ | 524/451 |
| 5,750,612 A | * | 5/1998 | Zyagawa et al. ............ | 524/451 |
| 5,883,174 A | * | 3/1999 | Akagawa et al. ............ | 524/451 |
| 5,891,946 A | * | 4/1999 | Nohara et al. ............... | 524/427 |
| 5,985,973 A | * | 11/1999 | Sumitomo et al. ........... | 524/451 |
| 6,034,165 A | * | 3/2000 | Tomomatsu et al. ......... | 524/451 |

FOREIGN PATENT DOCUMENTS

| | | | |
|---|---|---|---|
| EP | 0 316 693 | 5/1989 | |
| EP | 0 636 650 | 2/1995 | |
| EP | 0 784 074 A1 * | 7/1997 | ........... C08L/23/10 |
| EP | 0 825 228 | 2/1998 | |
| EP | 0 908 492 A1 * | 4/1999 | ........... C08L/23/10 |
| EP | 0916701 A1 | 5/1999 | |
| EP | 1 081 189 A1 * | 3/2001 | ........... C08L/23/10 |
| JP | 9-071691 | 3/1997 | |
| JP | 10-045971 | 2/1998 | |
| JP | 11-071431 | 3/1999 | |
| WO | WO 94/06859 | 3/1994 | |
| WO | WO 97/49765 | 12/1997 | |
| WO | WO 98/47959 | 10/1998 | |

* cited by examiner

*Primary Examiner*—Rip A. Lee
(74) *Attorney, Agent, or Firm*—Oblon, Spivak, McClelland, Maier & Neustadt, P.C.

(57) ABSTRACT

A propylene-based resin composition has good external appearance due to good weld appearance and low gloss and has excellent mechanical properties such as impact resistance and stiffness. The composition is well-balanced in the external appearance and mechanical properties. Automotive interior trims made of the composition are also described. The propylene-based resin composition comprises (A) 60 to 90% by weight of a propylene-based resin (1) comprising 78 to 88% by weight of 23° C. p-xylene insolubles (a) and 12 to 22% by weight of 23° C. p-xylene solubles (b), (2) the insolubles (a) having an isotactic pentad fraction of 95% or higher, a relaxation time ($\tau$) of 0.01 to 0.35 second at an angular frequency ($\omega$) of 10°/sec when measured by melt viscoelastometry and a molecular weight distribution index (PDI) of 1 to 18 which is expressed by $\omega_2/10\omega_1$ wherein $\omega_1$ is an angular frequency at which a storage modulus (G') as measured by melt viscoelastometry is $2\times10^2$ Pa and $\omega_2$ is an angular frequency at which a storage modulus (G') as measured by melt viscoelastometry is $2\times10^4$ Pa, and (3) the solubles (b) having an intrinsic viscosity [$\eta$] (in decalin at 135° C.) of 3.3 dl/g or higher and an ethylene unit content of 43% by weight or smaller; (B) 0 to 10% by weight of a rubberlike elastomer; and (C) 10 to 30% by weight of talc. The automotive interior trims are produced by injection-molding the composition.

2 Claims, No Drawings

PROPYLENE RESIN COMPOSITION AND INTERIOR AUTOMOTIVE MEMBER COMPRISING THE SAME

TECHNICAL FIELD

The present invention relates to propylene-based resin compositions and automotive interior trims such as instrument panels made of the compositions, and more particularly, to propylene-based resin compositions excellent in external appearance such as good weld appearance and low gloss, excellent in mechanical properties such as impact resistance and stiffness, and well-balanced in these properties, and also to automotive interior trims made of the compositions.

BACKGROUND ART

With recent tendency toward non-coating finish of automotive interior trims such as instrument panels for the purpose of reducing the production costs, there are rapidly growing demands for developing interior parts having excellent appearance such as good weld appearance and low gloss giving relaxed feeling by preventing light reflection. Also, the demands for safeguard and low-cost materials are coming more severe. In addition, the recent tendency to produce whole parts of instrument panels from the same material creates demand for materials well-balanced in impact resistance and stiffness so as to meet the performance requirements of any parts of instrument panels.

Conventionally, low-cost, general-purpose propylene-based resins have been widely used as materials for automotive interior trims. It is known that the impact resistance (room-temperature Izod impact strength) of propylene-based resins can be effectively improved by blending a styrene-based elastomer. However, the use of styrene-based elastomer causes problems such as increased production cost and high gloss of molded articles.

As molding materials having an excellent low-temperature impact resistance, there have been proposed, for example, a resin composition obtained by blending a crystalline propylene-ethylene block copolymer with an ethylene-α-olefin copolymer produced in the presence of a metallocene catalyst (Japanese Patent Application Laid-Open Nos. 7-145272 and 7-145298); a resin composition obtained by blending a propylene-based resin with an ethylene-butene-1 copolymer having a relatively large butene-1 unit content (produced substantially in the presence of a metallocene catalyst) (Japanese Patent Application Laid-Open Nos. 6-192506 and 7-18151); and a resin composition obtained by blending a propylene-based resin with an ethylene-octene-1 copolymer having a relatively large octene-1 unit content (produced substantially in the presence of a metallocene catalyst) (International Publication No. WO94/6859). These resin compositions exhibit a good low-temperature impact resistance, but fail to produce molded articles having a sufficiently low gloss.

Thus, the propylene-based resin compositions used as materials for automotive interior trims are required to simultaneously satisfy the antinomic characteristics, i.e., mechanical properties such as impact resistance and stiffness and external appearance. The conventional propylene-based resin compositions have been improved in the balance of these properties to some extent, but are still unsatisfactory.

DISCLOSURE OF THE INVENTION

The present invention has been made to solve the above problems. Thus, an object of the present invention is to provide resin compositions having excellent mechanical properties such as impact resistance and stiffness as well as good external appearance such as good weld appearance and low gloss, and being remarkably well-balanced in the external appearance and the mechanical properties. It is another object of the present invention to provide automotive interior trims such as instrument panels which are produced by injection-molding the compositions.

As a result of extensive studies for solving the above problems, the present inventors have found that resin compositions capable of achieving the above objects are obtained by blending a propylene-based resin having specific properties with talc and optionally a rubber-like elastomer at a particular mixing ratio. The present invention has been accomplished based on this finding.

Thus, a propylene-based resin composition of the present invention comprises:

(A) 60 to 90% by weight of a propylene-based resin,
  (1) comprising 18 to 88% by weight of 23° C. p-xylene insolubles (a) and 12 to 22% by weight of 23° C. p-xylene solubles (b),
  (2) the insolubles (a) having an isotactic pentad fraction of 95% or higher, a relaxation time ($\tau$) of 0.01 to 0.35 second at an angular frequency ($\omega$) of $10^0$/sec when measured by melt viscoelastometry and a molecular weight distribution index (PDI) of 1 to 18 which is expressed by $\omega_2/10\omega_1$ wherein $\omega_1$ is an angular frequency at which a storage modulus (G') as measured by melt viscoelastometry is $2\times10^2$ Pa and $\omega_2$ is an angular frequency at which a storage modulus (G') as measured by melt viscoelastometry is $2\times10^4$ Pa, and
  (3) the solubles (b) having an intrinsic viscosity [$\eta$] (in decalin at 135° C.) of 3.3 dl/g or higher and an ethylene unit content of 43% by weight or smaller;
(B) 0 to 10% by weight of a rubber-like elastomer; and
(C) 10 to 30% by weight of talc.

Further, automotive interior trims of the present invention are produced by injection-molding the above propylene-based resin composition.

BEST MODE FOR CARRYING OUT THE INVENTION

The propylene-based resin used as the component (A) of the resin compositions according to the present invention has the following properties.

When treated with p-xylene at 23° C., the component (A) is fractionated into 78 to 88% by weight of p-xylene insolubles (a) and 12 to 22% by weight of p-xylene solubles (b). When the content of p-xylene insolubles is less than 78% by weight, resultant molded articles are insufficiently balanced in impact resistance and stiffness. When the content of p-xylene insolubles is more than 88% by weight, resultant molded articles fail to show good weld appearance and sufficiently low gloss. The fractionation of the component (A) by p-xylene may be conducted by completely dissolving sample resin in p-xylene at 130° C. and then cooling the resultant solution to 23° C., thereby fractionating the sample resin into solubles and insolubles.

The insolubles (a) are required to have an isotactic pentad fraction of 95% or higher. The isotactic pentad fraction referred to herein can be obtained from the signals present in the methyl carbon region of $^{13}$C-NMR spectra. When the isotactic pentad fraction is less than 95%, resultant molded articles are insufficient in the balance between impact resistance and stiffness and also poor in scratch resistance.

Therefore, it is desirable that the isotactic pentad fraction is 95% or higher.

The insolubles (a) have a relaxation time ($\tau$) of 0.01 to 0.35 second, preferably 0.05 to 0.30 second, more preferably 0.05 to 0.20 second at an angular frequency ($\omega$) of $10°$/sec when measured by melt viscoelastometry. A relaxation time ($\tau$) of less than 0.01 second will provide molded articles having an insufficient balance between impact resistance and stiffness. A relaxation time ($\tau$) of more than 0.35 second will fail to produce molded articles having sufficient weld appearance and sufficiently low gloss. In view of the foregoing, the relaxation time ($\tau$) is preferred to be 0.01 to 0.35 second. The relaxation time ($\tau$) referred to herein was calculated by the formula: $G'/\omega G''$ wherein $G'$ is storage modulus and $G''$ is loss modulus obtained by imposing sinusoidal shear strain on a sample at 175° C. and an angular frequency ($\omega$) of $10°$/sec using a rotary rheometer (System 4 of Rheometrics Co., Ltd.) having a 25 mm$\phi$ cone plate with a cone angle of 0.1 radian.

The insolubles (a) have a molecular weight distribution index (PDI) of 1 to 18, preferably 5 to 15. PDI is represented by $\omega_2/10\omega_1$ wherein $\omega_1$ is an angular frequency at which the storage modulus ($G'$) obtained by melt viscoelastometry is $2\times10^2$ Pa and $\omega_2$ is an angular frequency at which the storage modulus ($G'$) is $2\times10^4$ Pa. PDI of less than 1 will result in insufficient balance between impact resistance and stiffness of resulting molded articles. When PDI exceeds 18, resultant molded articles show insufficient weld appearance and insufficiently low gloss. Therefore, the molecular weight distribution index (PDI) is preferably 1 to 18. The PDI was obtained through measurement at 175° C. under 30% strain using a rotary rheometer (System 4 of Rheometrics Co., Ltd.) having a 25 mm$\phi$ cone plate with a cone angle of 0.1 radian.

In the present invention, in addition to the above properties of the insolubles (a), the solubles (b) of the component (A) are required to have an ethylene unit content of 43% by weight or smaller. An ethylene unit content exceeding 43% by weight will result in insufficiently balanced impact resistance and stiffness, and poor scratch resistance. In view of this and in order to achieve improved balance between external appearance such as weld appearance and low gloss and mechanical properties such as impact resistance and stiffness, the ethylene unit content is preferably 40% by weight or smaller, more preferably 20 to 40% by weight, still more preferably 33 to 39% by weight.

The intrinsic viscosity [$\eta$] of the solubles (b) measured in decalin at 135° C. is 3.3 dl/g or higher, preferably 3.5 to 4.0 dl/g. An intrinsic viscosity [$\eta$] of less than 3.3 dl/g provides molded articles having insufficient weld appearance and insufficiently low gloss. Therefore, the intrinsic viscosity [$\eta$] is preferably 3.3 dl/g or higher. When exceeding 4.0 dl/g, resultant resin composition is likely to cause agglomeration during melt kneading.

The propylene-based resin serving as the component (A) preferably has a melt index (MI) of 1 to 100 g/10 min when measured at 230° C. under a load of 2.16 kgf (21.2 N). If MI is less than 1 g/10 min, the resin composition will have poor moldability due to low fluidity. When exceeding 100 g/10 min, resultant molded articles will have deteriorated mechanical properties. In view of the moldability and the balance in mechanical properties, MI is preferably 5 to 70 g/10 min, more preferably 8 to 40 g/10 min. MI referred to herein was measured according to JIS K7210.

The method of producing the propylene-based resin as the component (A) is not particularly restricted, and various methods are usable as long as propylene-based resins satisfying the above requirements are produced. For example, the respective components which are separately produced by polymerization may be blended together to prepare the component (A).

Alternatively, propylene-ethylene block copolymers as the component (A) can be produced by multiple-stage polymerization in the presence of a catalyst system comprising a solid component (a) composed of a solid catalyst component (i) comprising magnesium, titanium, halogen atom and an electron donor, and optionally a crystalline polyolefin (ii), an organic aluminum compound (b), and an ordinary electron-donating compound (c).

In the catalyst system to be used for the multi-stage polymerization, the solid catalyst component (a) is composed of the solid catalyst component (i) containing magnesium, titanium, halogen atom and an electron donor, and optionally the crystalline polyolefin (ii). The solid catalyst component (i) can be prepared by contacting a magnesium compound, a titanium compound and an electron donor. The halogen atom is contained in the magnesium compound and/or the titanium compound in the form of a halide.

The magnesium compound may be a reaction product of metal magnesium, halogen and/or a halogen-containing compound, and an alcohol. Although the titanium compound may be any known titanium compound, preferred is a titanium compound with high halogen content, particularly titanium tetrachloride. The titanium compound may be used alone or in combination of two or more.

The electron donor may be selected from the electron-donating compounds for the component (c). The solid catalyst component (i) may be prepared by any known methods proposed in Japanese Patent Application Laid-Open Nos. 53-43094, 55-135102, 55-135103, 56-18606, 56-166205, 57-63309, 57-190004, 57-300407 and 58-47003).

The crystalline polyolefin as the optional component (ii) for the solid component (a) includes, for example, $C_2-C_{10}$ $\alpha$-olefins such as polyethylene, polypropylene, polybutene, poly-4-methyl-1-pentene. These crystalline polyolefins may be prepared by any known methods, for example, by pre-polymerizing propylene in the presence of a combination of the solid catalyst component (i), an organic aluminum compound and optionally an electron-donating compound (pre-polymerization method).

The organic aluminum compound as the component (b) may be represented by the formula (1):

$$AlR_p^1X_{3-p} \qquad (I)$$

wherein $R^1$ represents an alkyl group having 3 to 20 carbon atoms or an aryl group having 6 to 20 carbon atoms; X represents a halogen atom; and p represents a number of 1 to 3.

The catalyst system generally contains an electron-donating compound as the component (c). The electron-donating compound may be a compound containing oxygen, nitrogen, phosphorus, sulfur and silicon, and basically a compound capable of improving the stereospecificity of propylene polymers. For example, preferably used are organic silicon compounds, esters, ketones, ethers, thioethers, acid anhydrides and acid halides.

Although Ziegler-type solid catalysts are described above in detail, metallocene catalysts which have attracted special interest recently may be used for producing the propylene-based resins. The propylene-based resin used as the component (A) in the invention can be produced by various methods, for example, produced by multi-stage polymerization in the presence of the catalyst system mentioned above. The polymerization order and the number of the polymerization stages of the multi-stage polymerization may be suitably determined as required. For example, in the initial polymerization (first-stage polymerization), propylene may be homo-polymerized or co-polymerized (for example, with ethylene and other olefins in an amount of 2% by weight or less) to give a crystalline propylene-based polymer, and in second or later stage, ethylene and propylene may be subjected to random copolymerization, or ethylene, propylene and other α-olefins or polyenes may be subjected to random copolymerization.

Upon the polymerization, the components (a) to (c) may be mixed in contact with each other in a predetermined ratio to give a catalyst system, and immediately after the preparation of the catalyst system, the monomers may be introduced to the reaction vessel, thereby starting the polymerization. Alternatively, the monomers may be introduced after aging the catalyst system for 0.2 to 3 hours. After the polymerization, the reaction mixture may be post-treated in known manners. The resin composition of the present invention may contain one or more propylene-based resins as the component (A).

The resin composition of the invention contains a rubber-like elastomer as the component (B). Examples of the rubber-like elastomer include polybutadiene, styrene-butadiene copolymer, acrylonitrile-butadiene copolymer, polymers of conjugated diene compounds such as polyisoprene, ethylene-propylene random copolymer (ethylene.propylene rubber) and ethylene-$C_{4-10}$ α-olefin random copolymer. Of these rubber-like elastomers, preferred are ethylene-propylene random copolymer (ethylene.propylene rubber) and binary copolymer rubbers obtained by randomly copolymerizing ethylene and octene-1.

The resin composition of the present invention may contain, as the component (B), an ethylene-$C_{3-18}$ α-olefin copolymer produced in the presence of a metallocene catalyst. The ethylene-α-olefin copolymer has a density of 0.850 to 0.875 g/cm$^3$. If the density is lower than 0.850 g/cm$^3$, the stiffness of resultant molded articles is insufficient. If the density is larger than 0.875 g/cm$^3$, the impact resistance cannot be improved sufficiently. In view of stiffness and impact resistance of resultant molded articles, the density is more preferably 0.855 to 0.870 g/cm$^3$. The melt index (MI) of the ethylene-α-copolymer is 0.01 to 25 g/10 min. MI smaller than 0.01 g/10 min cannot improve the impact resistance of molded articles sufficiently, and molded articles will likely to have flow marks. MI larger than 25 g/10 min will fail to provide low gloss and sufficient impact resistance in the creped area. In view of impact resistance, low gloss and moldability, MI is preferably 0.01 to 6 g/10 min, more preferably 0.01 to 1 g/10 min. MI referred to herein was measured at 190° C. under a load of 2.16 kgf (21.2 N).

The $C_{3-18}$ α-olefins used as comonomers of the copolymer include, for example, straight-chain α-olefins such as butene-1, pentene-1, hexene-1, octene-1, nonene-1, decene-1 and dodecene-1; and branched α-olefins such as 3-methylbutene-1 and 4-methylpentene-1. Of these comonomers, especially preferred are straight-chain $C_{4-10}$ α-olefins. These α-olefins can be used either singly or in combination of two or more. If desired, a diene component, for example, such as dicyclopentadiene, ethylidenenorbornene, 1,4-hexadiene, 1,9-decadiene and vinyl-norbornene may be combinedly used.

The ethylene-α-olefin copolymers as the component (B) may be suitably selected from any commercially available products, for example, ENGAGE (trade name of The Dow Chemical Company) POEs sold by Dow Chemical Japan Co., Ltd.

The resin composition of the present invention contains talc as the component (C). In view of the properties such as stiffness, impact resistance, scratch-whitening resistance, weld appearance and prevention of uneven gloss, preferred are talc having an average particle size of 1 to 8 μm and an average aspect ratio 4 or larger. Especially preferred are those produced by mechanical grinding in view of the physical properties and the stiffness.

The resin composition of the invention contains 60 to 90% by weight of the propylene-based resin as the component (A), 0 to 10% by weight of the rubber-like elastomer as the component (B), and 10 to 30% by weight of talc as the component (C). If the content of the component (A) is smaller than 60% by weight, molded articles have insufficient weld appearance and gloss not sufficiently low in the creped area. In addition, flow marks occur due to poor moldability. If larger than 90% by weight, the impact resistance will be poor. The content of the component (B) is preferably 0 to 7% by weight, more preferably 0 to 3% by weight. If the content of the component (B) exceeds the above range, molded articles have insufficient weld appearance and gloss not sufficiently low. If the content of the component (C) is smaller than 10% by weight, molded articles such as instrument panels are deteriorated in dimensional accuracy and stiffness. A content larger than 30% by weight results in poor moldability and insufficient weld appearance of molded articles.

The resin composition of the invention may optionally contain various known additives such as pigments, nucleating agents, weathering agents, antioxidants, antistatic agents, flame retardants, dispersants, etc. The method for producing the propylene-based resin composition of the invention is not specifically defined. For example, the components (A) and (C), optional component (B) and the other additives are melt-kneaded in a single-screw extruder, a twin-screw extruder, a Bumbury mixer, a kneader, rolls etc. to give the composition.

The automotive interior trims of the invention are produced by molding the propylene-based resin composition in any conventional injection-molding methods such as compressed injection-molding and vapor-blowing injection-molding. The automotive interior trims include, for example, instrument panels, door trims, console boxes, etc.

The invention is described in more detail with reference to the following Examples, which, however, are not intended to restrict the scope of the invention. The physical properties of molded articles produced were measured according to the methods mentioned below.

(1) Melt Index (MI)

Melt index of each propylene-based resin composition and propylene-based polymer was measured according to JIS K7210.

(2) Izod Impact Strength

Molded test pieces were tested according to JIS K7110 to measure Izod impact strength.

(3) Bending Modulus

Molded test pieces were tested according to JIS K7203 to measure bending modulus.

(4) Weld Appearance

The rear surface of each molded test piece was visually checked. The weld appearance was rated as ⊙ when substantially no weld portion was recognized, rated as ○ when weld portion was slightly recognized with practically no problem, rated as Δ when weld portion was slightly remarkable with difficulty in practical use, and rated as × when weld portion was remarkable.

(5) Low Gloss

Molded test pieces were tested according to JIS K7105 to measure the gloss.

(6) Isotactic Pentad Fraction

Into a 10φ NMR test tube, were placed 220 mg of sample. To the test tube, were added 3 ml of 1,2,4-trichlorobenzene/heavy benzene (90/10 volume %) to dissolve the sample therein at 140° C., thereby obtaining a homogeneous solution. The solution was subjected to $^{13}$C-NMR analysis under the conditions, frequency: 45 MHz; spectrum width: 25,000 Hz; temperature: 130° C.; pulse width: 8 μsec; pulse interval: 4 sec; number of integration: 10000 times.

The properties of propylene-based resin were measured according to the methods mentioned above.

1. Production of Propylene Block Copolymer (PP-1)

(1) Preparation of Magnesium Compound

A 500-liter glass reactor equipped with a stirrer was fully purged with nitrogen gas. Then, 97.2 kg of ethanol, 640 g of iodine and 6.4 kg of metal magnesium were charged into the reactor and stirred under reflux to give a solid reaction product. The reaction mixture containing the solid reaction product was dried under reduced pressure to obtain a magnesium compound (solid reaction product).

(2) Preparation of Solid Catalyst Component

Into a 500-liter, three-necked glass flask which had been fully purged with nitrogen gas, were charged 30 kg of the magnesium compound (not ground) prepared in (1), 150 liters of purified heptane, 4.5 liters of silicon tetrachloride and 4.3 liters of di-n-butyl phthalate. Stirring the contents of the flask at 90° C., 144 liters of titanium tetrachloride were added, and reacted at 110° C. for 2 hours. The solid product formed was isolated and washed with purified heptane at 80° C. Then, 228 liters of titanium tetrachloride were added to further continue the reaction for 2 hours at 110° C. After sufficiently washing with purified heptane, a solid catalyst component was obtained.

(3) Pre-Treatment Prior to Polymerization

Into a 500-liter reactor equipped with a stirrer, were charged 230 liters of purified n-heptane and 25 kg of the solid catalyst component obtained in (2) successively. Then, 0.6 mole of triethyl aluminum and 0.4 mole of dicyclopentyldimethoxysilane were added per one mole of titanium in the solid catalyst component. Next, propylene was introduced into the reactor until the propylene partial pressure reached 0.3 kg/cm$^2$ G to carry out the reaction at 20° C. for 4 hours. After completion of the reaction, the solid catalyst component was washed several times with n-heptane and stirred for 24 hours while blowing carbon dioxide.

(4) Polymerization for Producing Propylene Block Copolymer (PP-1)

In the first stage, the solid catalyst component treated in (3) was fed into a 200-liter polymerization reactor (first polymerization reactor) equipped with a stirrer at a feeding rate of 0.6 mmol/hr in terms of Ti, along with 4.0 mmol/kg-PP of triethylaluminum and 0.4 mmol/kg-PP of dicyclopentyldimethoxysilane, and propylene were polymerized at 85° C. under a pressure (total pressure) of 28 kg/cm$^2$ G. During the polymerization, the feeding rates of ethylene and hydrogen were controlled so that the resulting copolymer had desired ethylene content and molecular weight.

Then, the formed powder was continuously discharged out of the first reactor and transferred into a 200-liter polymerization reactor (second polymerization reactor) equipped with a stirrer. In the second reactor, the polymerization was carried out at 70° C. under a pressure (total pressure) of 15 kg/cm$^2$ G, while controlling the feeding rates of propylene, ethylene and hydrogen so as to produce a copolymer having desired chemical composition and molecular weight. The formed powder was continuously discharged out of the second polymerization reactor and granulated to obtain a propylene block copolymer (PP-1).

2. Production of Propylene Block Copolymers (PP-2 to PP-6)

The same procedures as in the production of PP-1 were repeated except for changing the blending ratio as shown in Table 1, thereby obtaining propylene block copolymers PP-2 to PP-6.

EXAMPLES 1–4 AND COMPARATIVE EXAMPLES 1–5

Propylene-based resin (A), rubber-like elastomer (B) and talc (C) were mixed with 1.0 part by weight, based on 100 parts by weight of the total of (A) to (C), of a dark gray pigment (PP-DHH7343, trade name of Dainichi Seika Co., Ltd.). The amount and properties of each of the components (A) to (C) are shown in Tables 1-1 and 1-2 where the weight percentages of the components (A) to (C) are based on the total (100% by weight) of the components (A) to (C) and the weight percentages of the components (a) and (b) are based on the total (100% by weight) of the components (a) and (b). The mixture was kneaded in a twin-screw kneader to prepare molding materials, which was then injection-molded at a resin temperature of 220° C. into test pieces (140×140×3 mm; creped plates for trims). The results of measurements of the physical properties and external appearance of the test pieces are shown in Table 1-2.

TABLE 1-1

|  | Examples | | | | Comparative Examples | | | | |
|---|---|---|---|---|---|---|---|---|---|
|  | 1 | 2 | 3 | 4 | 1 | 2 | 3 | 4 | 5 |
| Propylene-Based Resin | | | | | | | | | |
| Kind | PP-1 | PP-1 | PP-1 | PP-1 | PP-2 | PP-3 | PP-4 | PP-5 | PP-6 |
| wt. % | 75 | 73 | 69 | 83 | 73 | 73 | 73 | 73 | 73 |
| (a) 23° C. p-xylene insolubles | | | | | | | | | |
| wt. % | 83 | 83 | 83 | 83 | 83 | 84 | 83 | 83 | 90 |
| Isotactic pentad fraction (%) | 97.3 | 97.3 | 97.3 | 97.3 | 97.6 | 97.7 | 97.5 | 97.7 | 97.3 |
| τ sec | 0.12 | 0.12 | 0.12 | 0.12 | 0.14 | 0.11 | 0.14 | 0.14 | 0.11 |
| PDI | 10 | 10 | 10 | 10 | 10 | 10 | 10 | 10 | 10 |
| (b) 23° C. p-xylene solubles | | | | | | | | | |
| wt. % | 17 | 17 | 17 | 17 | 17 | 16 | 17 | 17 | 10 |
| Ethylene content (wt. %) | 37 | 37 | 37 | 37 | 48 | 37 | 47 | 56 | 42 |

TABLE 1-1-continued

|  | Examples | | | | Comparative Examples | | | | |
| --- | --- | --- | --- | --- | --- | --- | --- | --- | --- |
|  | 1 | 2 | 3 | 4 | 1 | 2 | 3 | 4 | 5 |
| Intrinsic viscosity [η] (dl/g) | 3.8 | 3.8 | 3.8 | 3.8 | 3.8 | 2.8 | 2.9 | 2.1 | 2.9 |
| MI (g/10 min) | 9 | 9 | 9 | 9 | 9 | 14 | 13 | 11 | 12 |

TABLE 1-2

|  | Examples | | | | Comparative Examples | | | | |
| --- | --- | --- | --- | --- | --- | --- | --- | --- | --- |
|  | 1 | 2 | 3 | 4 | 1 | 2 | 3 | 4 | 5 |
| (B) Rubber-like Elastomer | | | | | | | | | |
| Kind | LL | LL | LL | LL | LL | LL | LL | LL | LL |
| wt. % | 2 | 4 | 8 | 2 | 4 | 4 | 4 | 4 | 4 |
| (C) Talc | | | | | | | | | |
| wt. % | 23 | 23 | 23 | 15 | 23 | 23 | 23 | 23 | 23 |
| Physical Properties of Test Pieces | | | | | | | | | |
| MI (g/10 min) | 13 | 11 | 8 | 12 | 10 | 14 | 14 | 12 | 13 |
| IZOD impact strength (kJ/m²) | 32 | 58 | NB | 46 | 28 | 33 | 26 | NB | 22 |
| Bending Modulus (MPa) | 2980 | 2660 | 2460 | 2300 | 2740 | 2650 | 2730 | 2530 | 2950 |
| External Appearance of Test Pieces | | | | | | | | | |
| Weld appearance | ⊙ | ○ to ⊙ | ○ | ⊙ | ⊙ | Δ | Δ to ○ | X | X |
| Low gloss (%) | 2.1 | 2.1 | 2.2 | 2.1 | 2.1 | 2.4 | 2.2 | 2.9 | 2.5 |

Note
LL: metallocene LL (EG-8100 produced by The Dow Chemical Company).
Talc: JM209 (trade name) produced by Asada Seifun Co., Ltd. having an average particle size of 4.2 μm measured by a laser particle size analyzer SALD2000A manufactured by Shimadzu Corporation.

INDUSTRIAL APPLICABILITY

The propylene-based resin compositions of the present invention have good external appearance such as good weld appearance and low gloss as well as excellent mechanical properties such as impact resistance and stiffness. Thus, the propylene-based resin compositions are well-balanced between the external appearance and mechanical properties without any adverse affection to each other irrespective of contradictory natures of these properties. Also, the resin composition provides molded articles requiring no coating finish, thereby reducing the production costs. Thus, the resin compositions of the present invention are suitable as molding materials for automotive interior trims.

The automobile interior trims made of the resin compositions of the invention have good external appearance such as weld appearance and low gloss, and can eliminate finish coatings, thereby reducing production costs. In addition, the automotive interior trims are also excellent in mechanical properties such as impact resistance and stiffness, and well-balanced between the external appearance and the mechanical properties without any adverse affection to each other irrespective of contradictory natures of these properties. Therefore, the automotive interior trims of the invention are favorably used as instrument panels, etc.

What is claimed is:
1. A propylene-based resin composition comprising:
(A) 60 to 90% by weight of a propylene-based resin,
 (1) comprising 78 to 88% by weight of 23° C. p-xylene insolubles (a) and 12 to 22% by weight of 23° C. p-xylene solubles (b),
 (2) the insolubles (a) having an isotactic pentad fraction of 95% or higher, a relaxation time (τ) of 0.01 to 0.35 second at an angular frequency (ω) of $10^0$/sec when measured by melt viscoelastometry and a molecular weight distribution index (PDI) of 1 to 18 which is expressed by $\omega_2/10\omega_1$ wherein $\omega_1$ is an angular frequency at which a storage modulus (G') as measured by melt viscoelastometry is $2 \times 10^2$ Pa and $\omega_2$ is an angular frequency at which a storage modulus (G') as measured by melt viscoelastometry is $2 \times 10^4$ Pa, and
 (3) the solubles (b) having an intrinsic viscosity [η] (in decalin at 135° C.) of 3.3 dl/g or higher and an ethylene unit content of 43% by weight or smaller;
(B) 0 to 10% by weight of a rubber-like elastomer; and
(C) 10 to 30% by weight of talc.
2. An automotive interior trim produced by injection-molding the propylene-based resin composition of claim 1.

* * * * *